(No Model.)
M. PORTER.
CORN DRILL.
No. 314,604. Patented Mar. 31, 1885.
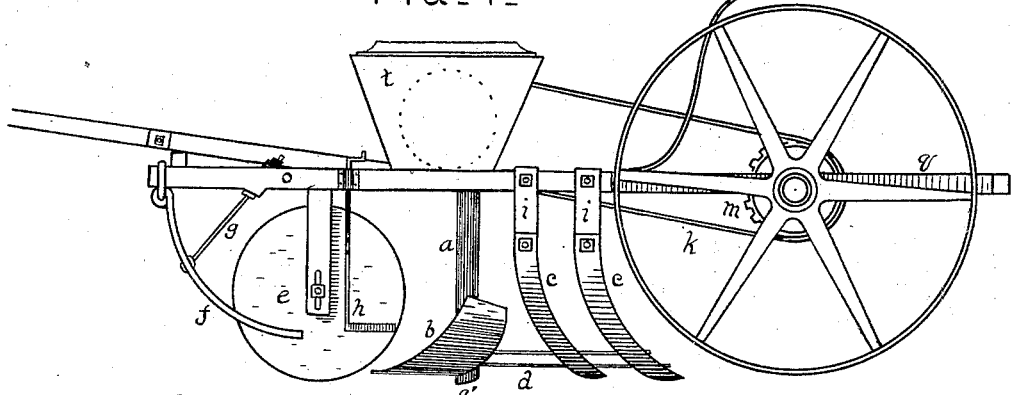
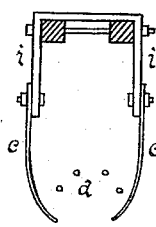
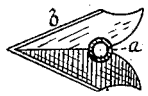
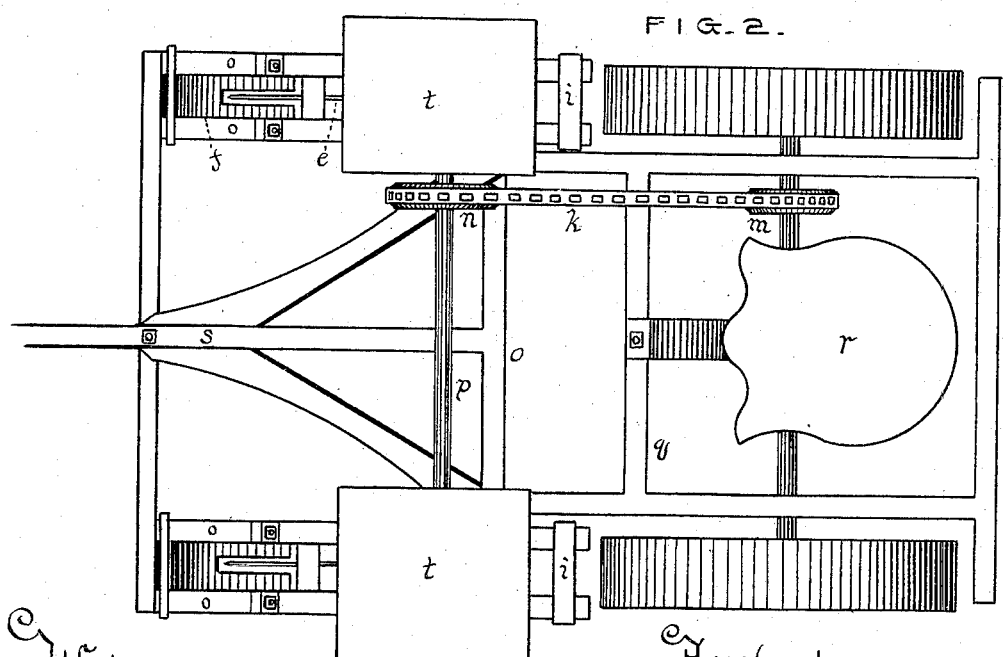
Witnesses.
C. C. Clark
J. N. Bills
Inventor
MOSES PORTER.
By L. P. Graham
atty.

UNITED STATES PATENT OFFICE.

MOSES PORTER, OF LOVINGTON, ILLINOIS.

CORN-DRILL.

SPECIFICATION forming part of Letters Patent No. 314,604, dated March 31, 1885.

Application filed June 20, 1884. (No model.)

*To all whom it may concern:*

Be it known that I, MOSES PORTER, a citizen of the United States, residing near Lovington, in the county of Moultrie and State of Illinois, have invented certain new and useful Improvements in Corn-Drills, of which the following is a specification.

It is becoming a prevalent opinion among observing farmers that corn planted in drills yields better in proportion to the land and labor than when planted in check-rows and plowed both ways. This opinion is founded on actual experience, and is accounted for by the facts that more corn can be planted to the acre when drilled; that the individual grains can be placed farther apart, thereby giving more room for the roots, and that by dispensing with cross-plowing the roots are not so much disturbed.

The disadvantage of drilling has heretofore been the difficulty of keeping the corn clean by plowing on two sides thereof; but it has become an established fact that if the corn is well covered with fine loose ground, and the row left considerably depressed with relation to the surrounding ground, there will be no difficulty on that point, as the corn will make a quick growth, and there can always be sufficient ground thrown into the depression to completely smother the weeds.

To produce a corn-drill that will successfully conform to the conditions above named is the object of my invention.

In the drawings accompanying and forming a part of this specification, Figure 1 is a side view of my device. Fig. 2 is a plan of the same. Fig. 3 is a rear elevation of the covering device, and Fig. 4 a plan of the plow.

$a$ is a tubular shaft that acts as a standard for the plow and a conveyer for the corn.

$b$ is a plow attached to standard $a$.

$c$ are knives or scrapers, curved inwardly and to the rear.

$d$ is a series of steel rods extending back from plow $b$ between scrapers $c$.

$e$ is a rolling cutter located directly in front of plow $b$.

$f$ is a sliding shoe, slotted at its rear termination to admit the cutter $e$.

$g$ is an adjustable brace for shoe $f$.

$h$ is a scraper adapted to be thrown in contact with the cutter. A similar device should be arranged on each side of each cutter, and all connected in a manner that will enable the driver to bring them simultaneously into operation.

$i\ i$ are clamp supports for knives $c\ c$.

$k\ m\ n$ represent a sprocket-gear for imparting motion from the main shaft of the planter to the seed-dropping shaft $p$.

$o$ is the forward, and $q$ the rearward, frame of the planter.

$p$ is a drop-shaft that should be connected with the drop-plate by means of suitable gearing.

$r$ is the seat, $s$ is the tongue, and $t$ the seed-boxes, of the planter.

$a'$ shows the lower termination of shaft $a$.

In operation as the planter is moved across the field in the customary manner the shoe $f$ presses all clods out of the way, and slides onto pieces of sod and holds the same firmly while acted on by the rolling cutter $e$. The plow $b$ follows in the way opened by the cutter, and opens a furrow at the bottom of which the grain is deposited by tube $a\ a'$. The rods $d$ extend backward, and by their arrangement form an arched shield over the open furrow. The scrapers or knives not only act as pulverizers, but also by their construction tend to throw the dirt back into the furrow. As the dirt is thrown back into the furrow by knives $c\ c$, rods $d$ act as a screen through which the pulverized ground freely passes, while the large clods are thrown off by the elastic rods. The wheel of the planter follows in the customary manner, and assists in forming the depression commenced by the plow and aided by the action of shield $d$.

I claim as new and desire to secure by Letters Patent—

1. The combination of shaft $a$, plow $b$, screen $d$, and scrapers $c\ c$, as and for the purpose set forth.

2. The combination of plow $b$, screen $d$, scrapers $c\ c$, and cutter $e$, as and for the purpose set forth.

3. The combination, in a corn-drill, of plow $b$, screen $d$, scrapers $c$, cutter $e$, and shoe $f$, as and for the purpose set forth.

4. The combination of plow $b$, screen $d$, scrapers $c$, cutter $e$, and scrapers $h$, as and for the purpose set forth.

MOSES PORTER.

Attest:
I. D. WALKER,
L. P. GRAHAM.